Patented Mar. 7, 1933

1,900,599

UNITED STATES PATENT OFFICE

EGON ELÖD, OF KARLSRUHE, GERMANY

PROCESS FOR THE PRODUCTION OF CELLULOSE FORMATES

No Drawing. Application filed August 5, 1927, Serial No. 211,004, and in Germany August 9, 1926.

Numerous attempts have been made to prepare cellulose esters of formic acid (so-called formyl celluloses) by bringing formic acid, highly concentrated on occasion, into reaction with cellulose, substances containing cellulose, or cellulose derivatives, for a considerable time, mostly many hours or several days, in presence of catalyzers and at ordinary or elevated temperature. The catalyzers used consisted, for example, of hydrochloric acid, sulphuric acid, or chlorides such as those of sulphuric acid or phosphoric acid, or salts such as zinc chloride. The formyl celluloses obtained in accordance with the known methods are unstable compounds, which split off formic acid, under the influence of moisture, when exposed to the air, and consequently have not attained any technical importance (see for example, Hottenroth, 'Die Kunstseide', Leipzig 1926, p. 381; also Fr. Reinthaler, 'Kunstseide', Berlin 1926, p. 112).

The difficulty in preparing formyl celluloses is due to the concurrence of two reactions, namely the degradation of the molecule on the one hand, and esterification on the other. Hence, the esters obtained by the known methods constitute more or less extensively degraded, and therefore practically unusable, products. It has now been ascertained that the two reactions proceed at different velocities and that it is possible, by employing suitable working conditions, to influence the rate of esterification in such a way as to enable the highest stage of formylation to be attained before any disturbing degradation of the cellulose molecule becomes evident.

Extensive researches have revealed the possibility of attaining such a degree of success, by conducting the esterification process in presence, on the one hand, of considerable quantities of agents capable of dissolving or swelling cellulose, and, on the other hand, of catalyzers which assist the esterification but not the degradation of the cellulose, and by using highly concentrated (for example 98–100%) formic acid, with the precaution that the reaction is interrupted when the desired degree of formylation has been attained. By working in this way, it has been found that practically complete formylation can be effected before any measurable degradation of the cellulose becomes manifest.

The substances coming under consideration as solvents or swelling agents comprise, for example, zinc chloride, calcium bromide and the like. In addition to their solvent and swelling properties, they may at the same time exert a favorable influence on the esterification. The esterifying catalyzers comprise such substances as hydrochloric acid, phosphoric anhydride and the like. The reaction is preferably conducted in the complete absence of water as far as practicable and therefore by employing 100% formic acid, anhydrous zinc chloride and the like. An important factor in the attainment of good results consists in employing the solvent or swelling agents, and also the catalyzers, in considerable quantities. The relative proportions best adapted to give the best results can be easily ascertained by preliminary experiments.

If the above described working conditions be maintained, the cellulose or cellulose derivative employed will be transformed, in a very short time, into a homogeneous mass, from which the resulting ester can be recovered, for example by treating the mass with substances such as water, alcohol, acetone, ether and the like. Working at ordinary temperature, the esterification process can be carried out, for example to the formation of a triformyl cellulose, in an exceedingly short space of time, for example in less than an hour. In many cases, however, still shorter periods occasionally a few minutes only are needed for the formylation process.

When the desired degree of formylation has been attained, the reaction is interrupted, because continuing it further may give rise to undesirable degradation of the cellulose or cellulose products. Of course it is not always necessary to carry the formylation to the extreme limit, and the process may therefore be interrupted sooner. The interruption can be effected in a very simple manner, for example by kneading the reaction mixture with water such as ⅓ to ¼ part by weight of water per 1 part by weight of the mixture and separating the ester which is thereby precipitated. The ester can then be washed, dried, and, if necessary, dissolved in suitable solvents. It is a perfectly stable product, admirably adapted for technical purposes. Films, thin sheets, artificial silk, lacquers and all other kinds of technical cellulose products can be manufactured from the formyl cellulose prepared in accordance with the invention.

For the further treatment of the cellulose formates obtainable according to the invention, use may be made of solvents, swelling agents and plasticizing agents of the usual kind. Suitable substances for such treatment comprise, inter alia, thiocyanates of the alkalis and alkaline earths, nitromethane, formamides, glycerol formates, chlorhydrins, or substances containing constituents of this kind, or mixtures containing a plurality of such substances, or such substances in combination with other solvents and swelling agents.

Examples 1. 100 grms. of slightly nitrated cellulose are mixed at ordinary temperature and in presence of 50 grms. of anhydrous zinc chloride, with 500 grms. of absolute formic acid which has been saturated with HCl gas at ordinary temperature. After the reaction has proceeded for about an hour, or less, the reaction mixture is precipitated, for example by pouring it into water, the precipitate being carefully dried, and dissolved, for example in diformine.

2. 3 kilogs. of linters are mixed at ordinary temperature and in presence of 2 kg. of zinc chloride, with 18 kg. of absolute formic acid which, for example, is saturated with HCl gas. After a short time, such as 20-30 minutes, the reaction mixture is precipitated with water, the precipitate being carefully dried, and dissolved, for example in formamide.

The further treatment of the solutions obtained according to Examples 1 and 2, for the production of artificial silk, films and the like, can be carried out according to the usual methods.

The process affords the advantage of taking only a very short time and furnishing stable products of considerable value. For example, artificial silks manufactured from formyl cellulose produced by the present process, are distinguished, inter alia, by a high capacity for resisting the effects of wetting.

The undesirable degradation of the cellulose or cellulose derivatives such as nitrated cellulose and the like can also be retarded by operating at low temperatures, preferably below 0° C. In this manner, however, the esterification is also retarded, so that many hours are required for carrying out the process under these conditions. Operating at very low temperatures is also attended with the drawback that congelation may set in, and consequently the uncertainty of the reaction proceeding in the solid phase has to be taken into consideration. It is therefore preferable to operate at somewhat higher temperatures, such as 5° C. and upwards, and advisably at ordinary, or sometimes slightly elevated temperature. In these circumstances the reaction proceeds in a homogeneous medium and with considerable rapidity and reliability.

What I claim is:—

1. The process of preparing cellulose formates which comprises reacting cellulose with substantially anhydrous formic acid in the presence of hydrochloric acid gas as a formylating catalyst and in the presence of zinc chloride in quantities of at least 50% of the initial cellulose, the reaction being discontinued before any substantial degradation of the cellulose occurs.

2. The process of preparing cellulose formates which comprises reacting cellulose with approximately anhydrous formic acid in the presence of a formylating catalyst and a cellulose dispersing agent in quantities of at least 50% of the initial quantities of cellulose and discontinuing the reaction before any substantial degradation of the cellulose occurs.

3. The process of preparing cellulose formates which comprises reacting cellulose with approximately anhydrous formic acid in the presence of a formylating catalyst of a hydrochloric acid as a formylating catalyst and in presence of at least 50% of the initial cellulose at temperatures above 5° C., and discontinuing the reaction before any substantial degradation of the cellulose occurs.

4. The process of preparing cellulose formates which comprises reacting cellulose with approximately anhydrous formic acid in the presence of a formylating catalyst of phosphoric anhydride and in the presence of a cellulose dispersing agent in quantities of at least 50% of the initial cellulose at a temperature above 5° C., and discontinuing the reaction before any substantial degradation of the cellulose occurs.

5. The process of preparing cellulose formates which comprises reacting cellulose with approximately anhydrous formic acid in the presence of a formylating catalyst consisting of phosphoric anhydride in the presence of another material consisting of calcium bromide at ordinary temperature, and discontinuing the reaction before any substantial degradation of the cellulose occurs.

In testimony whereof I have signed my name this 25th day of July, 1927.

EGON ELÖD.